April 12, 1932.  L. G. BATES ET AL  1,853,842
APPARATUS FOR AND METHOD OF FEEDING MOLTEN GLASS
Filed Oct. 12, 1929
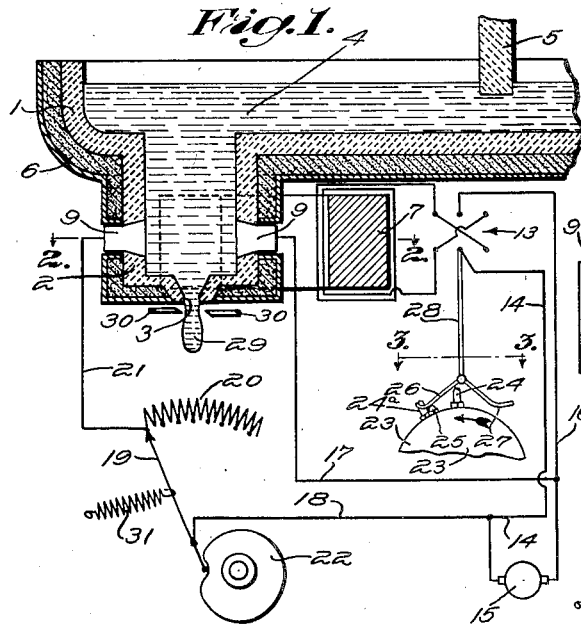
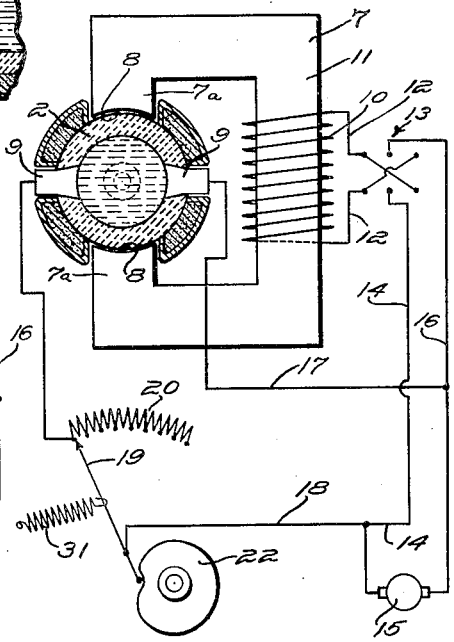
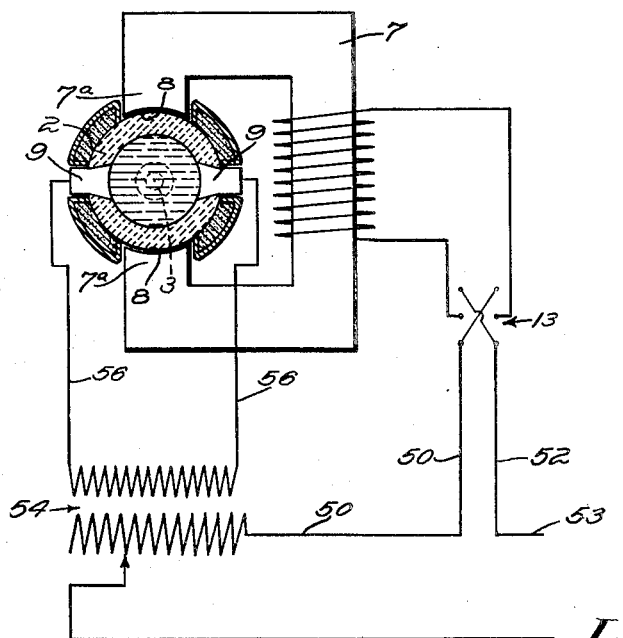
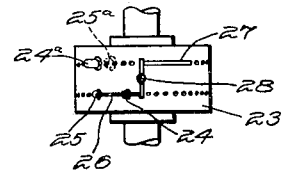
Witness;
W. B. Thayer.
Inventors
Lloyd G. Bates
Frank E. Haskell
By Brown & Parlaw
Attorneys Patented Apr. 12, 1932

1,853,842

UNITED STATES PATENT OFFICE

LLOYD G. BATES, OF WEST HARTFORD, CONNECTICUT, AND FRANK E. HASKELL, OF HOLYOKE, MASSACHUSETTS, ASSIGNORS TO HARTFORD-EMPIRE COMPANY, OF HARTFORD, CONNECTICUT, A CORPORATION OF DELAWARE

APPARATUS FOR AND METHOD OF FEEDING MOLTEN GLASS

Application filed October 12, 1929. Serial No. 399,297.

This invention relates generally to apparatus for and methods of controlling the movement of molten glass and more particularly to such methods and apparatus as utilize controlled force to control the delivery of molten glass from a submerged outlet of a container in such manner as to form suspended mold charges of regulably controlled shape and of suitable form and condition to be advantageously used in glass fabricating machines.

In one type of glass feeding apparatus in general use and in methods involving the use of such apparatus, the controlled force is produced by reciprocating a refractory plunger in the glass in working alignment with the discharge outlet so that the stroke of the plunger toward the outlet accelerates the discharge of glass into suspension below the outlet while the return stroke of the implement retards, stops or reverses the flow of glass through the outlet. It also has been proposed to produce controlled glass discharge regulating force by applying super-atmospheric and/or sub-atmospheric pressures to the glass at or adjacent to the outlet.

An object of the present invention is to control the movement of molten glass by applying controlled force thereto without the necessity of reciprocating a plunger or other implement in contact with the glass or applying super-atmospheric and/or sub-atmospheric pressures to the glass.

A further object of the invention is to control the movement of molten glass by a controlled force that is produced in such manner as also to cause a desirable heating and conditioning of the glass.

A further object of the invention is to control the delivery of molten glass from the discharge outlet of a glass container in suspended charges electro-magnetically, with an attendant electro-thermal action on the glass, thereby permitting desirable control of the shape of the charges and also tending to produce a desirable condition of temperature, viscosity and homogeneity in the glass.

Generally described, the invention contemplates introducing a magnetic flux into the glass that is to be moved with the lines of force of the flux passing through the glass substantially at right angles with the path of desired movement of the glass and the provision of an electric current passing through the glass at right angles both with the lines of force of the magnetic flux and also with the path of desired movement of the glass. A dynamic force thus will be set up in the glass, tending to move the glass in one of opposite directions along a path extending at right angles with both the flux and the electric current. The relation to each other of the direction of the lines of force of the flux and of the direction of flow of the electric current in the glass will determine in which of the two opposite directions the dynamic force on the glass will be exerted. This direction may be reversed by reversing the direction of flow of the current while the magnetic flux remains unchanged or by reversing the magnetic flux without changing the direction of flow of the current.

The invention may be used to control the movement of molten glass in and adjacent to a submerged discharge outlet of a forehearth or other container for controlling the shape and formation of successive mold charge masses in suspension below the outlet. The particular embodiment of the invention that is illustrated in the accompanying drawings therefore shows the application of the invention to a glass feeding forehearth to control the delivery from a submerged discharge outlet of molten glass for the production of suspended charges of predetermined regulably controlled shape. It, however, is to be understood that the invention is not restricted to this application but may be employed to produce controlled movement of various electrically conductive fluids under various conditions of service and to meet a wide variety of possible requirements.

Many beneficial features of the invention and objects thereof not specifically enumerated above will become apparent from the following specification and from a consideration of the accompanying drawings, in which:

Figure 1 is a more or less diagrammatic fragmentary vertical sectional view, showing a portion of a glass flow channel or forehearth having a downwardly opening discharge passage and outlet and equipped with apparatus embodying structural features and adapted for use in the performance of method steps of the invention;

Fig. 2 is a section substantially along the line 2—2 of Fig. 1, looking in the direction of the arrows;

Fig. 3 is a plan sectional view of timing mechanism of the apparatus of Fig. 1, the view being taken substantially along the line 3—3 of Fig. 1; and Fig. 4 is a view similar to Fig. 2, showing a modified form of apparatus for carrying out the invention.

A fragmentary portion of a forehearth 1 is shown in Fig. 1 as being provided adjacent to its outer end with a downwardly extending well or discharge passage 2 terminating in a reduced discharge opening 3. The discharge opening 3 and the well 2 are continuously submerged by molten glass 4 which flows thereto beneath a gate 5 from a source which is not shown but which may be a melting tank or any other convenient source of supply of molten glass.

The forehearth 1 and the well or discharge portion thereof may be provided with heat insulation, such as indicated at 6, and may be supported and constructed in any suitable known manner. The gate 5 may be vertically adjustable so as to regulate the head of glass above the discharge outlet 3, or any other suitable known means may be provided for regulating the flow of glass to the well. With the gate 5 located out of vertical alignment with the well, heat may be introduced into the space above the glass for heating such glass uniformly without any portion thereof being shielded more or less from the heat by an implement depending into the glass in or above the well. This permits a relatively effective and uniform heating and conditioning of the glass above the outlet and tends to prevent cold streaks in the discharging glass.

In carrying out the invention, a magnetic field frame 7, best seen in Figs. 2 and 4, may be supported in any suitable known manner in a horizontal position adjacent to the well or discharge passage 2 so that the field poles 7a are disposed at diametrically opposite sides of the well 2. The faces of the field pieces 7a may be curved arcuately to conform to the curvature of the well, as indicated at 8 in Figs. 2 and 4, and the insulation may be omitted between the faces of the field poles and the refractory wall of the well 2.

A pair of opposed electrodes 9 extend through suitable openings in opposite sides of the well 2 at right angles with the field poles 7a and in the plane of the latter. These electrodes 9 may be made of any suitable material, preferably carbon, and their contact faces with the glass are of sufficient area, as compared with the cross-sectional area of the glass between the electrodes, to prevent over-heating of the electrodes when a suitable electric current is passing through the glass between such electrodes. These electrodes may be locally cooled in any suitable known manner, if desired.

The terminals of a field coil 10, which surrounds the core 11 of the magnetic field frame, are connected by suitable electrical conductors 12 with a suitable reversing switch, shown diagrammatically at 13. This reversing switch may be of any suitable known construction. In the arrangement shown in Figs. 1 and 2, one side of the reversing switch is connected by an electrical conductor 14 to one side of a generator 15. The opposite side of the generator 15 is connected to the second side of the switch 13 by an electrical conductor 16. The generator also may be connected electrically with the opposed electrodes 9. This may be effected, as in the illustration shown in Figs. 1 and 2, by connecting the conductors 14 and 16 with the electrodes. The conductor 16 is connected directly with one of the electrodes by means of a conductor 17. The conductor 14 is connected by a conductor 18 with the movable arm 19 of a rheostat 20, the latter being connected by a conductor 21 with the second electrode 9. With this arrangement, electricity may be supplied conductively to the glass in the well by the electrodes 9 both when the switch 13 is open and when such switch has been closed in either of opposite directions. The amount of electric current and the electro-thermal effect thereof on the glass may be varied by the operation of the rheostat 20.

It is to be understood that, if desired, variations in the current in the field circuit and consequently variations in the field magnetism may be employed for obtaining different values of the mechanical force instead of by means of varying the current flow in the glass. It should also be observed that variations in the current flowing in the glass changes both the mechanical force and the heating while variations in the magnetic flux change the mechanical force but not the heating. It is thus possible by properly substituting the values employed for both the amount of electric current in the glass and the magnetic flux to obtain just the desired mechanical force and just the desired heating.

When the switch 13 has been closed in one direction, current will flow from the generator in one direction through the field coil 10, thereby providing a magnetic flux in the glass of the well 2, the lines of force of which are at right angles with the direction of flow of current between the electrodes 9. This will cause the application of an electro-dynamic force on the glass in the well 2, tending to move the glass vertically in one direction. By reversing the direction of closing of the switch 13, the direction of flow of electric current through the field coil 10 will be reversed and the lines of force of the magnetic flux in the glass will be reversed, thereby tending to move the glass in the well 2 vertically in the opposite direction. Thus, when the reversing switch has been closed in one direction, the electro-dynamic force set up in the glass in the well will accelerate discharge of glass through the outlet 3 while, when the reversing switch has been closed in the opposite direction, the electro-dynamic force will act to retard, stop or reverse the flow of glass through the outlet.

The effective dynamic force thus set up in the glass may be varied by varying the current flow between the electrodes 9. A current adapted to provide the maximum dynamic action on the glass desired may be selected and then the effective electrodynamic force on the glass may be decreased by interposing more or less resistance in the current conducting line, as by moving the rheostat arm 19 from the position shown in Figs. 1 and 2 toward the right. While the reversing switch 13 is open, as shown in Figs. 1 and 2, the glass may flow from the outlet 3 by gravity but the current passing between the electrodes 9 will continue to heat the glass.

It may be desirable to vary the flow accelerating electro-dynamic force and the flow retarding, stopping or reversing electro-dynamic force or either of such forces during the formation of a suspended mold charge mass. To this end, the rheostat arm 19 may be moved periodically across the resistance coils of the rheostat, as by means of a cam such as indicated at 22 in Figs. 1 and 2. A spring 31 may be employed to return the rheostat arm to its "off" position when the cam will permit and to maintain the arm 19 in operative relation with the cam.

It also is desirable that the times of closing the reversing switch 13 in opposite directions may be varied and regulably controlled and that the periods during which the reversing switch is open between successive closing movements thereof likewise should be capable of regulable control. To this end, the reversing switch may be controlled by a suitable timing mechanism. Such timing mechanism may comprise a rotary drum 23 having on its periphery and adjustable circumferentially thereof relatively long actuating studs or projections 24 and 24a and shorter studs or projections 25 and 25a for the respective angularly disposed actuating arms 26 and 27 of pivoted switch operating mechanism 28. These sets of studs and the respective arms 26 and 27 are in different vertical planes, as shown in Fig. 3. With the timing cylinder 23 rotating counter-clockwise from the position shown in Fig. 1, the relatively long stud 24 for operating the arm 26 would contact with the latter and close the switch in one direction. The relatively short stud 25a which is in the same vertical plane as the arm 27 would, at a predetermined time in the cycle of rotation of the timing disc 23, contact with the arm 27 to return the switch to open position. At a further time in the cycle of rotation of the timing cylinder 23, the second long stud 24a would strike the arm 27 and close the switch in the opposite direction. Then at a still further time in the cycle of the rotation of the timing cylinder 23, the second short stud 25 would strike the arm 26 and return the switch to open position. Thus, the durations and times of commencement of the electro-dynamic flow accelerating and electro-dynamic flow retarding, stopping or reversing actions on the glass in the discharge passage while the switch is closed and the durations of the periods of unmodified gravity flow while the switch is open may be varied according to particular requirements.

A cycle of operations in the feeding of molten glass in suspended charges may be substantially as follows: Starting with the condition shown in Figs. 1 and 2, it is to be understood that the discharge of glass from the outlet 3 has been controlled to form a suspended mold charge mass, such as indicated at 29 in Fig. 1, and that the shears 30, which may be of any suitable known construction, are about to close to sever the suspended charge from the glass in the outlet. At this time, the reversing switch is open and the rheostat is "off". The cam 22 and the timing drum 23 may be operated in suitably timed relation with each other and with the operation of the shears by any suitable known means, examples of which are well known in the art. Shortly before, at or shortly after the shears begin to cut through the connecting glass to separate the preformed mold charge from the glass at the outlet, the reversing switch is closed in the direction required to produce the upwardly acting dynamic action on the glass in the discharge passage. This force may be predetermined by electric current selection and regulation to retard, stop or reverse the flow of glass through the outlet 3 as desired. The dynamic force thus produced may be relatively strong at the beginning of the period of application thereof, the rheostat being "off", and may be decreased during such period in a manner which, for convenience of explanation, may be said to be similar to the decrease in the retarding, stopping or reversing action on the glass of the upstroke of the shape controlling reciprocating plunger of the well-known type of automatic feeder hereinbefore referred to. The resistance introduced into the electric current conducting circuit by the rheostat may be sufficient to reduce the upwardly acting dynamic force on the glass so that such force will permit an initially retarded but gradually increasing gravity flow while the switch remains closed, the initial effect of such upwardly acting force being adequate to retard or stop the downward movement of the stub or to retract the stub as required to assure proper reheating of any portion thereof that may have been chilled by the shearing operation and to permit the opening of the shears without glass being piled up thereon and the desired movement of glass shaping molds or other mechanism below the outlet. At the proper time in the cycle of formation of the mold charge, the reversing switch is opened so that unmodified gravity flow takes place. This may be said to correspond generally with the period of dwell of the plunger of a reciprocating plunger feeder when such plunger has reached the upper limit of its stroke. After a period of unmodified gravity flow of regulable duration, the reversing switch may be closed in the opposite direction so that the electro-dynamic force now acts downwardly and accelerates discharge of glass through the outlet. At the inception of this downwardly acting dynamic force the rheostat 20 may be fully effective and therefore the discharge accelerating force may be relatively slight. Such force may be increased gradually by causing the rheostat arm 19 to move in response to the actuation of the spring 31 toward the "off" position of Fig. 1, so that the acceleration of glass through the outlet may be increased as the length of the mold charge mass of glass in suspension below the outlet increases. Thus, the portion of the suspended mass which would tend to attenuate and "thin out" may be augmented by the increased flow of glass to prevent such attenuation and to shape the mold charge mass as desired and in a manner which, for convenience of explanation, may be said to produce a shaping effect corresponding to that which is produced by the downstroke of the plunger of the aforesaid reciprocating plunger feeder. At the proper predetermined time, the reversing switch is opened and a period of unmodified gravity flow may occur at the end of the period of accelerated discharge. This last dwell or period of unmodified gravity flow may be relatively short or even practically non-existent as the reversing switch may be closed immediately to initiate another period of glass flow retardation, stoppage or reversal. This mode of operations would be attended by a maximum electrothermal action on the glass while the glass stub is being reheated to eliminate chill marks.

The arrangement as shown in Figs. 1 to 3 is suitable for use with direct current but it is to be understood that such an arrangement may be adapted in any suitable known manner, for use with alternating current, in which case an alternator may be substituted for the D. C. generator that is shown diagrammatically at 15, or an alternating current transformer may be used, the primary of which is connected to a suitable supply circuit.

The shape of the mold charge gather may be varied, to suit various types of molds to which the mold charge is to be delivered, by use of the hereinbefore described adjustments, either severally or variously combined, as by selective timing of the electro-dynamic flow accelerating and flow retarding, stopping or reversing forces with respect to each other and to the time of severance of the gather, regulation of the duration of the periods of application of such forces and of the periods of unmodified gravity flow, regulation of the rate and amount of variation of either or both of said electro-dynamic forces during the application thereof, selection of electric current to produce a regulable predetermined maximum flow accelerating and/or flow retarding, stopping or reversing effect, and such other adjustments and selections as are specifically disclosed herein or may fairly be implied from such disclosure.

The illustration of the cam 22 and of the rheostat controlled thereby is diagrammatic in that it is intended to represent any suitable known construction, including one or more adjustable cam lobes if required or a cam having any desirable configuration, whereby the flow accelerating and/or the flow retarding, stopping or reversing forces set up in the glass by the operation of the apparatus of the invention may be varied within the periods of their application to produce various shaping effects, such, for example, as may be produced by varying the character of the strokes of the plunger of the aforesaid reciprocating plunger feeder.

The modified form of apparatus shown in Fig. 4 is suitable for use with alternating current. The same reference numerals have been used to designate like parts and the description of the construction of Fig. 4 will be confined to features thereof which are different from the construction of Figs. 1 and 2. The reversing switch 13 of Fig. 4 has one side connected by a conductor 50 with one terminal of the primary of an adjustable transformer 54, the other terminal of which is connected with a lead wire 51. The opposite side of the reversing switch 13 is connected by a conductor 52 with a second lead wire 53. The secondary of the transformer 54 is connected by the conductors 56 with the electrodes 9. With this arrangement, current will pass between the electrodes only when the reversing switch 13 is closed. Thus, electro-thermal heating of the glass will be temporarily discontinued while the reversing switch is open.

The operation of the arrangement shown in Fig. 4 may be otherwise substantially the same in essential respects with the hereinbefore described operation of the construction shown in Figs. 1 and 2. It, of course, is to be understood that changes may be made in construction to meet different service conditions or requirements. For example, the field frame may be made of cast iron if direct current is used in Figs. 1 and 2. The field preferably is laminated if alternating current is used as in Fig. 4. Inasmuch as the field winding is largely inductive when alternating current is used, care should be taken to keep the flux and the current in the glass in proper phase relation to each other. The frequency of the alternating current should be kept sufficiently high to obviate any objectionable decomposing effect thereof on the glass.

Other features of the invention may be modified as to structure, combination and arrangement and the steps of the method likewise may be modified and varied without departing from the spirit and scope of the invention as set out in the appended claims.

In this application, we have disclosed and the more specific claims are directed to apparatus and methods having provision for introducing electric current conductively into the glass. In our companion related application, Serial No. 399,298 filed October 12, 1929, we have disclosed and claimed apparatus and methods which are characterized by structure and steps for producing electric current in the glass entirely by induction.

We claim:

1. The method of moving molten glass which comprises introducing magnetic lines of force into the glass to be moved substantially at right angles with the path of desired movement of the glass and producing an electric current flow in the glass substantially at right angles with both said lines of force and said path of desired movement of the glass, whereby said glass will be subjected to a mechanical force tending to move it along said path.

2. The method of moving molten glass which comprises, introducing magnetic lines of force into the glass to be moved substantially at right angles with the path of desired movement of the glass and passing an electric current through the glass substantially at right angles with both said lines of force and said path of desired movement of the glass, whereby said glass will be subjected to a mechanical force tending to move it along said path, and causing a relative reversal between the direction of said lines of force and of said electric current to reverse the direction of said mechanical force.

3. The method of moving molten glass which comprises, introducing magnetic lines of force into the glass to be moved substantially at right angles with the path of desired movement of the glass and passing an electric current through the glass substantially at right angles with both said lines of force and said path of desired movement of the glass, whereby said glass will be subjected to a mechanical force tending to move it along said path, and reversing the direction of said lines of force while maintaining the direction of flow of said electric current constant to reverse the direction of said mechanical force.

4. The method of moving molten glass which comprises, introducing magnetic lines of force into the glass to be moved substantially at right angles with the path of desired movement of the glass and passing an electric current through the glass substantially at right angles with both said lines of force and said path of desired movement of the glass, whereby said glass will be subjected to a force tending to move it along said path, and varying the rate of movement of said glass along said path by varying said force.

5. The method of moving molten glass which comprises, introducing magnetic lines of force into the glass to be moved substantially at right angles with the path of desired movement of the glass and passing an electric current through the glass substantially at right angles with both said lines of force and said path of desired movement of the glass, whereby said glass will be subjected to a force tending to move it along said path and varying the rate of movement of said glass along said path by interposing a varying resistance in the electric current supply circuit to vary the dynamic effect of said force in the glass.

6. The method of controlling the flow of electrically conductive fluid which comprises, introducing a magnetic flux into said fluid substantially at right angles with the direction of the path of desired movement of the fluid, and introducing an electric current conductively into the fluid so that the path of current flow through the fluid is substantially at right angles with both said magnetic flux and said path of desired movement of the fluid, whereby a mechanical force will be set up in the fluid, tending to move said fluid along said path.

7. The method of controlling the flow of molten glass through a submerged discharge outlet of a glass container, comprising the steps of introducing magnetic flux and electric current into the glass adjacent to the outlet in the required relation with respect to each other to cause a dynamic force to act in the glass for controlling the rate of flow of the glass from said outlet.

8. In the feeding of molten glass from a submerged discharge outlet of a glass container, the steps of introducing magnetic flux and electric current in the glass substantially at right angles with each other and with the axial line of said outlet to exert a flow changing effect on the glass at the outlet.

9. In the feeding of molten glass from a submerged discharge outlet of a glass container, the steps of introducing magnetic flux and electric current in the glass substantially at right angles with each other and with the axial line of said outlet to exert a flow regulating effect on the glass at the outlet, and changing said flow regulating effect by varying said electric current.

10. In the feeding of molten glass from a submerged discharge outlet of a glass container, the steps of introducing magnetic flux and electric current in the glass adjacent to the outlet at right angles with each other and with the axial line of the outlet to cause a dynamic action on such glass, exerted axially of said outlet, and reversing the direction in which said force will be exerted by causing a relative reversal of said magnetic flux and the direction of flow of said electric current in the glass.

11. In the feeding of molten glass through a submerged discharge outlet of a glass container, the steps of discharging glass by gravity from the outlet to form a portion of a mold charge mass and discharging more glass through the outlet by gravity modified by an electro-dynamic force set up in the glass adjacent to the outlet to form a further portion of said mold charge mass.

12. In the method of feeding molten glass from a submerged discharge outlet in mold charges, the steps of discharging glass through said outlet by gravity to form a portion of the mold charge and accelerating discharge of glass through the outlet by a force set up electro-magnetically in the glass adjacent to the outlet to form a further portion of said mold charge.

13. The method of feeding molten glass from a submerged outlet of a glass container in mold charges which comprises, discharging glass by gravity through the outlet to form a portion of a mold charge and retarding the gravity discharge of glass through the outlet for forming a further portion of said mold charge by inducing in the glass electro-magnetically a force acting in opposition to said gravity flow.

14. The method of feeding molten glass in mold charges of regulably controllable shape which comprises, discharging glass by gravity through a submerged discharge outlet of a glass container, periodically inducing electro-magnetically in the glass adjacent to the outlet forces acting to vary the rate of discharge of glass through the outlet, varying the discharge regulating effect of said forces to vary the shape of the mold charge mass in suspension below the outlet, and severing the mold charge from said mass when the desired shape has been attained.

15. The method of feeding molten glass in mold charges which comprises, passing molten glass downwardly through a discharge passage to a submerged discharge outlet at the bottom of said passage, introducing an electric current and magnetic flux in the glass in said passage substantially at right angles with each other and with the axial line of said outlet to cause acceleration of discharge of glass through the outlet, and severing the mold charge from the discharged glass when the desired shape has been attained.

16. The method of feeding molten glass in mold charges which comprises, passing molten glass downwardly through a discharge passage to a submerged outlet at the bottom of said passage, periodically accelerating discharge of glass through said outlet by forces set up in the glass in said passage by the action of magnetic flux and electric current passing through the glass in the passage substantially at right angles with each other and with the axial line of the outlet to aid in controlling the shape of the mold charge mass in suspension below the outlet, and variably timing said acceleration of discharge in the cycle of formation of a mold charge to regulably predetermine the shape of said mold charge.

17. The method of feeding molten glass in mold charges which comprises, passing molten glass downwardly through a discharge passage to a discharge outlet at the bottom of said passage, periodically accelerating discharge of glass through said outlet by introducing magnetic flux and electric current in the glass in said passage in proper relation with each other and with the axial line of the outlet to cause a flow accelerating force acting on the glass in line with the outlet, periodically retarding the discharge of glass from said outlet by causing a relative reversal between the direction of the magnetic flux and the direction of passage of the electric current in the glass, and periodically severing mold charges from successive masses of discharged glass in suspension below the outlet.

18. The method of feeding molten glass in mold charges which comprises, passing molten glass downwardly through a discharge passage to a discharge outlet at the bottom of said passage, periodically accelerating discharge of glass through said outlet by introducing magnetic flux and electric current in the glass in said passage in proper relation with each other and with the axial line of the outlet to cause a flow accelerating force acting on the glass in line with the outlet, periodically retarding the discharge of glass from said outlet by causing a relative reversal between the direction of the magnetic flux and the direction of passage of the electric current in the glass, periodically severing mold charges from successive masses of discharged glass in suspension below the outlet, and varying the shape of mold charges by varying the electric current to vary the effect of said flow regulating forces in the glass in said passage.

19. The method of feeding molten glass in mold charges which comprises, passing molten glass downwardly through a discharge passage to a discharge outlet at the bottom of said passage, periodically accelerating discharge of glass through said outlet by introducing magnetic flux and electric current in the glass in said passage in proper relation with each other and with the axial line of the outlet to cause a flow accelerating force to act on the glass in line with the outlet, periodically retarding the discharge of glass from said outlet by causing a relative reversal between the direction of the magnetic flux and the direction of passage of the electric current in the glass, periodically severing mold charges from successive masses of discharged glass in suspension below the outlet, and varying the shape of mold charges by varying the timing of said flow accelerating and flow retarding forces.

20. The method of feeding molten glass in mold charges which comprises, passing molten glass downwardly through a discharge passage to a discharge outlet at the bottom of said passage, periodically accelerating discharge of glass through said outlet by introducing magnetic flux and electric current in the glass in said passage in proper relation with each other and with the axial line of the outlet to cause a flow accelerating force to act on the glass in line with the outlet, periodically retarding the discharge of glass from said outlet by causing a relative reversal between the direction of the magnetic flux and the direction of passage of the electric current in the glass, periodically severing mold charges from successive masses of discharged glass in suspension below the outlet, and varying the shape of said mold charges by varying the duration of said flow accelerating and flow retarding forces.

21. The method of feeding molten glass in mold charges which comprises, passing molten glass downwardly through a discharge passage to a discharge outlet at the bottom of said passage, periodically accelerating discharge of glass through said outlet by introducing magnetic flux and electric current in the glass in said passage in proper relation with each other and with the axial line of the outlet to cause a flow accelerating force acting on the glass in line with the outlet, periodically retarding the discharge of glass from said outlet by causing a relative reversal between the direction of the magnetic flux and the direction of passage of the electric current in the glass, periodically severing mold charges from successive masses of discharged glass in suspension below the outlet, and varying the shape of mold charges by varying the duration of the intervals between said flow accelerating and said flow retarding forces.

22. Apparatus for controlling the movement of molten glass comprising means providing a passage containing molten glass, means for introducing magnetic flux into said glass substantially at right angles with said passage, and means for causing an electric current to flow through the glass substantially at right angles with both said magnetic flux and said passage, whereby a force will be set up tending to move said glass in one direction along said passage.

23. Apparatus for controlling the movement of molten glass comprising means providing a passage containing molten glass, means for introducing magnetic flux into said glass substantially at right angles with said passage, means for causing an electric current to flow through the glass substantially at right angles with both said magnetic flux and said passage, whereby a force will be set up tending to move said glass in one direction along said passage, and means for interposing a variable resistance to the passage of said electric current through the glass to vary the dynamic effect of said force on the glass in said passage.

24. Apparatus for controlling the movement of molten glass comprising means providing a passage containing molten glass, means for introducing magnetic flux into said glass substantially at right angles with said passage, means for causing an electric current to flow through the glass substantially at right angles with both said magnetic flux and said passage, whereby a force will be set up tending to move said glass in one direction along said passage, and means for controlling the application of said electric current and said magnetic flux to said glass.

25. Apparatus for controlling the movement of molten glass comprising means providing a passage containing molten glass, means for introducing magnetic flux into said glass substantially at right angles with said passage, means for causing an electric current to flow through the glass substantially at right angles with both said magnetic flux and said passage, whereby a force will be set up tending to move said glass in one direction along said passage, and means for causing a relative reversal between the direction of the magnetic flux and the direction of passage of the electric current through the glass in said passage to reverse the direction in which said force will tend to move glass along said passage.

26. Apparatus for controlling the movement of molten glass comprising means providing a passage containing molten glass, means for introducing magnetic flux into said glass substantially at right angles with said passage, mean for causing an electric current to flow through the glass substantially at right angles with both said magnetic flux and said passage, whereby a force will be set up tending to move said glass in one direction along said passage, and means for variably timing the operation of said reversing means.

27. The combination with a glass container having a glass discharge passage provided with a discharge outlet at its bottom of means for introducing electric current conductively into the glass in said passage to pass through said glass at right angle with the direction of flow of glass to said outlet, means for introducing a magnetic flux in the glass of said passage at right angles with the direction of flow of said electric current and also with the direction of flow of glass in said passage to said outlet, a variable resistance in the circuit for supplying said electric current to said glass, a reversing switch in the magnetic circuit, and means acting automatically to periodically reverse said reversing switch and to maintain said switch open temporarily in the intervals between said reversals.

28. The combination with a container for molten glass having a downwardly opening discharge outlet and a flow passage for conducting molten glass to said outlet, of a pair of diametrically opposite electrodes in contact with the glass at opposite sides of said passage, a magnetic field frame having pole piece disposed at opposite sides of said passage and spaced 90° from said electrodes, an electric circuit for setting up a magnetic flux through the glass between said pole pieces, a reversing switch in said electric circuit, means acting automatically to periodically reverse said switch, means for supplying electric current to said electrodes, and resistance means automatically varied in regular cycles for causing cycles of variation of the electric current passing through the glass between said electrodes.

29. The combination with a container having a downwardly opening discharge outlet and a flow passage for conducting molten glass to said outlet of means for controlling the discharge of glass through said outlet to aid in producing successive suspended mold charge masses of glass below the outlet and for heating the glass in the flow passage adjacent to the outlet, means for severing mold charges from said successive suspended masses, and means for automatically varying the heating of said glass during each cycle of mold charge formation.

30. The combination with a container having a downwardly opening discharge outlet and a flow passage for conducting molten glass to said outlet of means for controlling the discharge of glass through said outlet to aid in producing successive suspended mold charge masses of glass below the outlet and for heating the glass in the flow passage adjacent to the outlet, means for severing mold charges from said successive suspended masses, and means for controlling said heating means to cause a relatively great heating of the glass during the initial and final portions of each cycle of mold charge formation.

31. The combination with a container for molten glass having a downwardly opening submerged discharge outlet of electro-magnetic means for controlling discharge of glass through the outlet and for heating the glass adjacent to the outlet.

Signed at Hartford, Conn., this 9th day of October, 1929.

LLOYD G. BATES.
FRANK E. HASKELL.